United States Patent [19]

Kamiya

[11] Patent Number: 4,581,716

[45] Date of Patent: Apr. 8, 1986

[54] DATA MEMORY DEVICE

[75] Inventor: Hitoshi Kamiya, Hekinan, Japan

[73] Assignee: Nippondenso Co., Ltd., Kariya, Japan

[21] Appl. No.: 476,404

[22] Filed: Mar. 17, 1983

[30] Foreign Application Priority Data

Mar. 26, 1982 [JP] Japan .................................. 57-49755

[51] Int. Cl.⁴ .............................................. G06F 13/00
[52] U.S. Cl. .................................. 364/900; 364/708;
364/709; 365/226
[58] Field of Search ............... 365/226; 364/707, 712,
364/200 MS File, 900 MS File, 708, 709, 710;
235/487

[56] References Cited

U.S. PATENT DOCUMENTS

| 4,021,656 | 5/1977 | Caudel et al. | 364/712 X |
| 4,209,735 | 6/1980 | Yoshida | 364/707 X |
| 4,264,962 | 4/1981 | Kodaira | 364/708 X |

Primary Examiner—Raulfe B. Zache

Attorney, Agent, or Firm—Cushman, Darby & Cushman

[57] ABSTRACT

A compact portable card-shaped data memory device which effectively accesses stored coded data has a power supply device consisting of a plurality of horizontally arranged solar cells fitted to one side of a printed circuit board, both sides of which are impressed with printed circuit. The other side of the printed circuit board is fitted with semiconductor chips respectively constituting a semiconductor memory and a microcomputer for converting data read out of said semiconductor memory into serial coded data, and a light-emitting element which is optically controlled in conformity with said coded data. The semiconductor chips and a drive system for the light-emitting element are supplied with electric energy delivered from the power supply device. The circuit element section including the printed circuit board is sealed in a synthetic resin case, thereby constructing the data memory device wholly in a flat card form.

18 Claims, 18 Drawing Figures

FIG. 6
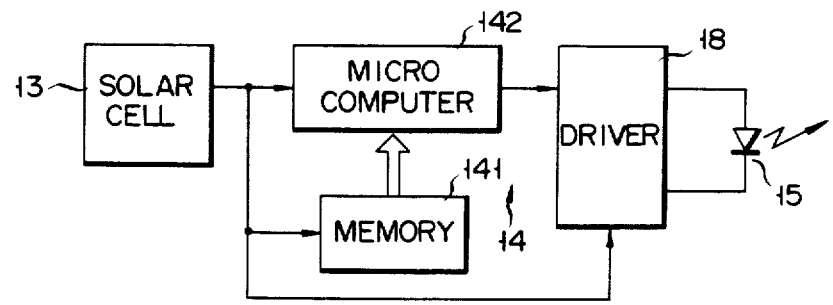
FIG. 7
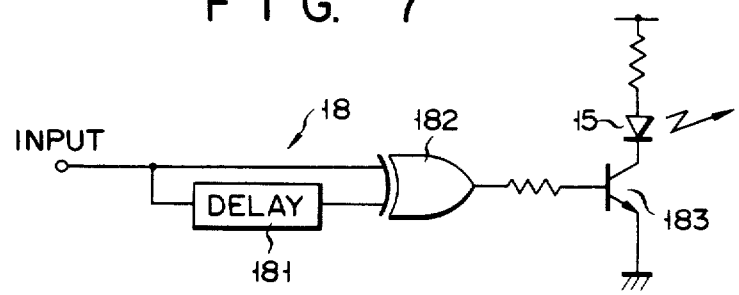
FIG. 8A
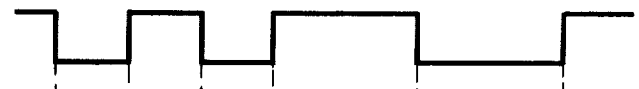
FIG. 8B
FIG. 8C
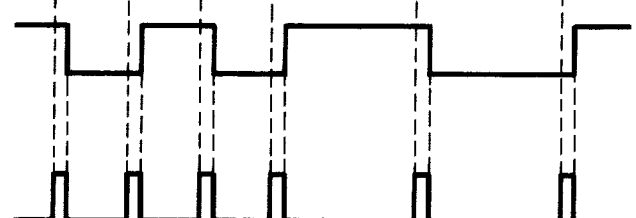
100~150 μs

DATA MEMORY DEVICE

BACKGROUND OF THE INVENTION

This invention relates to a data memory device and more particularly to a small portable memory device capable of storing data including secret codes or any other specified type of data.

To date, a data card has been proposed as a portable data recorder. Known data cards include a magnetic card provided with a magnetic recording medium and a bar code card impressed with optical patterns. With such data cards, a recording band is formed magnetically or by means of bar code patterns along the longer side of a rectangular data card. Recorded data is read out by scanning a recording band by a magnetic or optical reading head. Data is read out of a data card by a card reader which contacts a reading head with a recording band and causes both recording band and reading head to move relatively to each other.

An amount of data to be recorded in a data card is defined by a length of a recording band, or an area of a recording region, in case the recording band is formed of a plurality of tracks. To record a large amount of data, therefore, a recording band is extended to enlarge one side of a data card. With a card reader device, the reading head has to accurately scan an extended recording band. A card reader device for reading data from the data card has to be provided with a more complicated arrangement to cope with an increased amount of recorded data. The above-mentioned data card in which data is recorded magnetically or by means of optical patterns has the drawback that the recorded data is very likely to be damaged by external magnetic effects or soils.

SUMMARY OF THE INVENTION

It is accordingly an object of this invention to provide a novel data memory device, which, though sufficiently small, can record a large amount of data and efficiently read out the recorded data.

Another object of the invention is to provide a novel data memory device which enables the recorded data to be read out without applying any external electric energy.

Another object of the invention is to effectively manufacture a novel data memory device such as a credit card for recording, for example, secret code data.

Still another object of the invention is to provide a novel data memory device which enables various types of recorded data to be selectively read out.

A data memory device embodying this invention may include a power source for generating electric energy when actuated by optical energy and a logic circuit unit which is operated by the electric energy from said power source to issue coded data corresponding to the previously recorded data. Output coded data from the logic circuit unit drives an optical output device, thereby sending forth an optical read signal.

With the above-mentioned type of data memory device, optical energy issued from, for example, a lamp actuates the logic circuit unit. Coded data corresponding to the recorded data is optically delivered. A light-receiving element corresponding to said optical output device easily detects data read out of the memory device and conducts the detected data to a data processing system.

A memory device included in the logic circuit device is formed of a semiconductor integrated circuit, can store a sufficiently large amount of data quite safely in spite of its extremely small size.

The power source can be prepared from a plurality of solar cells, enabling the resultant data memory device to be constructed in the card form and effectively utilized as a data card, such as a magnetic card.

An instruction issued to the logic circuit by, for example, switch means causes a required item to be selectively read out from the recorded data, thereby rendering the data memory device adapted to serve diversified objects.

BRIEF DESCRIPTION OF THE DRAWING

FIG. 6 is a block diagram of the data memory device according to the first embodiment of the invention;

FIG. 7 shows a drive circuit for issuing an optical output from the microcomputer of FIG. 6;

FIGS. 8A to 8C indicate signal waveforms showing the operation of the drive circuit of FIG. 7;

DETAILED DESCRIPTION OF THE PREFERRED EMBODIMENTS

Figure 1:
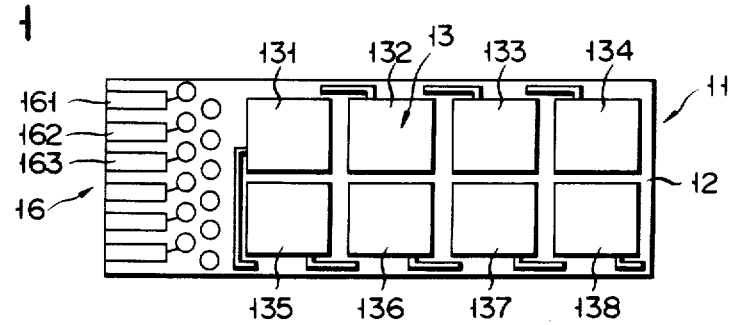
FIG. 1 is a plan view of a data memory device according to a first embodiment of this invention, before data is stored therein.
Figure 2:
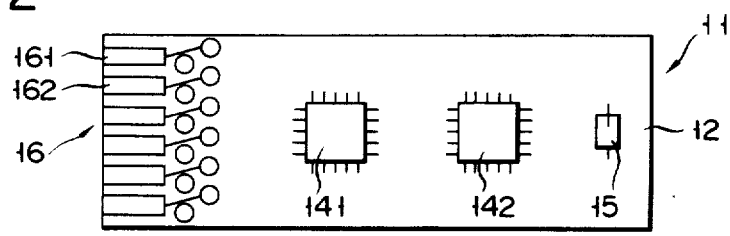
FIG. 2 is a back view of the data memory device of FIG. 1.
Figure 3:
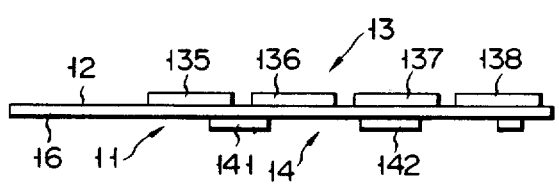
FIG. 3 is a side view of the data memory device of FIG. 1.

A data memory device 11 of FIGS. 1 to 3 according to a first embodiment of this invention includes a rectangular printed circuit board 12 constructed by impressing print wires on both sides of a rectangular insulation board.

A plurality of (for example, eight) solar cells 131 to 138 are soldered to the front side of the printed circuit board 12 in such arrangement as assures the effective utilization of the limited area of the printed circuit board 12. The output terminals of the solar cells 131 to 138 are connected to a power line constructed by the print wire circuit of the printed circuit board 12. The solar cells 131 to 138 collectively constitute a power supply device 13 utilizing a photovoltaic effect.

The backside of the printed circuit board 12 is fitted with semiconductor chips 141, 142 jointly constituting a logic circuit device 14. A light-emitting element 15 (for example, a light-emitting diode) is fitted in the proximity of one shorter side of the rectangular printed circuit board 12. The semiconductor chip 141 constitutes a semiconductor memory exclusively used to read out data. This memory is particularly of an involatile type which can hold recorded data in a power-off state. The semiconductor chip 142 constitutes a control circuit which reads out data stored in the memory of the chip 141 and converts the read-out data into serial coded data. Said semiconductor chip 142 is formed of, for example, a C-MOS type single chip type microcomputer having excellent low voltage characteristics. Other elements are properly provided as the need arises, such as a voltage stabilizing circuit and a peripheral circuit element including a circuit set to the initial stage when supplied with power. There, peripheral circuits may be assembled in the semiconductor chip 142 as the need arises.

The above-mentioned semiconductor memory formed of the semiconductor chip 141 holds specifically coded data to be supplied to the subject data memory device. While this data memory device is being manufactured, data is written in the memory from a write electrode section 16 extending along one shorter side of the rectangular print wire board 12. The electrode section 16 is formed of a plurality of electrodes 161, 162, . . . Data having a logic level of "1" or "0" is written in the prescribed address by supplying power through the selected ones of said electrodes 161, 162, . . . Data written in the address consists of, for example, a start code, secret code, characteristic code and stop code. Other codes than the characteristic code have such a relationship as provides a specific result by an arithmetic operation performed between the data memory device and a device for reading data from said data memory device. The characteristic code is exclusively allotted to each data memory device in distinction from another data memory device.

Figure 4:
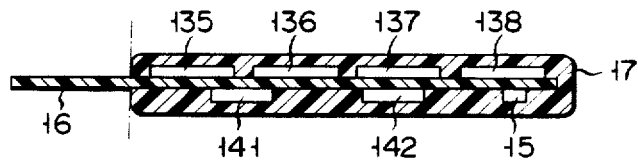
FIG. 4 is a cross sectional view of the data memory device of FIGS. 1 to 3 enclosed in a synthetic resin case.

The one clip type microcomputer constituted by the semiconductor chip 142 is a digital sequence control circuit in which a series of operation steps are prescribed by a control program. This control circuit comprises, as is well known, a program memory (ROM) supplied with a control program, transient data memory (RAM), central processing unit (CPU), input-output circuit (I/O interface), transmission line of data and control signals and timing circuit. The subject data memory device 11 is constructed by fitting the printed circuit board 12 with a power supply device 13, microcomputer and light-emitting element 15 and electrically connecting these elements by printed circuit. This data memory device 11 is sealed, as shown in FIG. 4, in a synthetic resin case 17 prepared from transparent synthetic resin. This synthetic resin case 17 is provided in an area corresponding to the elements of said data memory device 11. Those portions of the write electrodes 16 which project from the synthetic resin case 17 are cut off along line X-X. Finally, the data memory device is fabricated into a rectangular card form whose crosswise and longitudinal edges measure several centimeters and whose thickness measures several millimeters.

Figure 5:
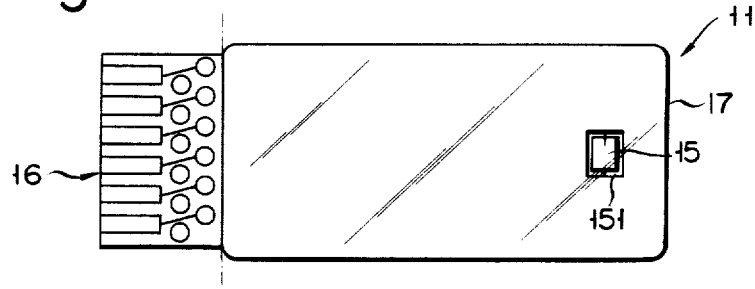
FIG. 5 is a back view of the data memory device of FIG. 4.

As previously described, the synthetic resin case 17 is prepared from transparent synthetic resin. However, the other portions of the backside of said synthetic resin case 17 than a window 151 corresponding to the light-emitting diode 15 of FIG. 5 have the exposed surface roughened or are properly colored to prevent the received semiconductor chips 141, 142 from being looked at from the outside.

FIG. 6 is a block diagram of the subject data memory device. D.C. voltage delivered from the power supply device 13 consisting of the solar cells is impressed on the semiconductor memory formed of semiconductor chips 141, 142, microcomputer and the drive circuit 18 of the light-emitting element. When the power supply device 13 is actuated, the microcomputer reads out data stored in the semiconductor memory through the prescribed procedure. The read-out data is converted into serial coded data, and supplied to the drive circuit 18 as a signal for modulating a frequency at the unit of one bit. It is advised to construct the drive circuit 18 by fitting parts to the printed circuit board 12 interposed between the semiconductor chip 142 and light-emitting diode with proper wiring provided.

The drive circuit 18 comprises a delay circuit 181 and exclusive OR circuit 182 and switching transistor 183 (FIG. 7). The input terminal of the drive circuit 18 is supplied with a frequency-modulated signal which corresponds to a data bit, and whose pulse width varies with the logic level "1" or "0" of a signal (FIG. 8A) issued from a microcomputer. The delay circuit 181 is so arranged as to have a delay time of 100 to 150 microseconds. An output signal from the delay circuit 181 which corresponds to the above-mentioned input signal has such a waveform as shown in FIG. 8B. Therefore, an output signal from the exclusive OR circuit 182 is turned into a pulse series indicated in FIG. 8C. Each pulse of said series is issued in a timing corresponding to the rise and fall of a modulated signal of FIG. 8A delivered from the computer. The pulse series signal controls the switching transistor 183, causing a light-emitting element 15 (FIG. 5) to send forth a light for each pulse of said series. In other words, the light emitting element 15 sends forth an optical output signal with a sufficiently small power consumption.

With the data memory device of this invention, the F2F modulation system is adopted as means for transmitting a signal representing read-out data. The F2F modulation system is a self-clocking type data-arranging process designed by integrating data with clock signals. This data-arranging process is already accepted in the field of recording and reproducing the data of a magnetic card. With said F2F modulation system, a signal is inverted for each specified period of time. The signal inversion defines a 1-bit phrase. The logic level "1" or "0" of data is determined according to whether or not the signal inversion is sustained in the proximity of a midpoint of each phrase. The adoption of the F2F modulation system for the data memory device of this invention is effective in decreasing the number of data bits to be transmitted, reducing power consumption and assuring an allowable range of precision with which a data signal is modulated to matching fluctuations in the power source voltage.

Figure 9:
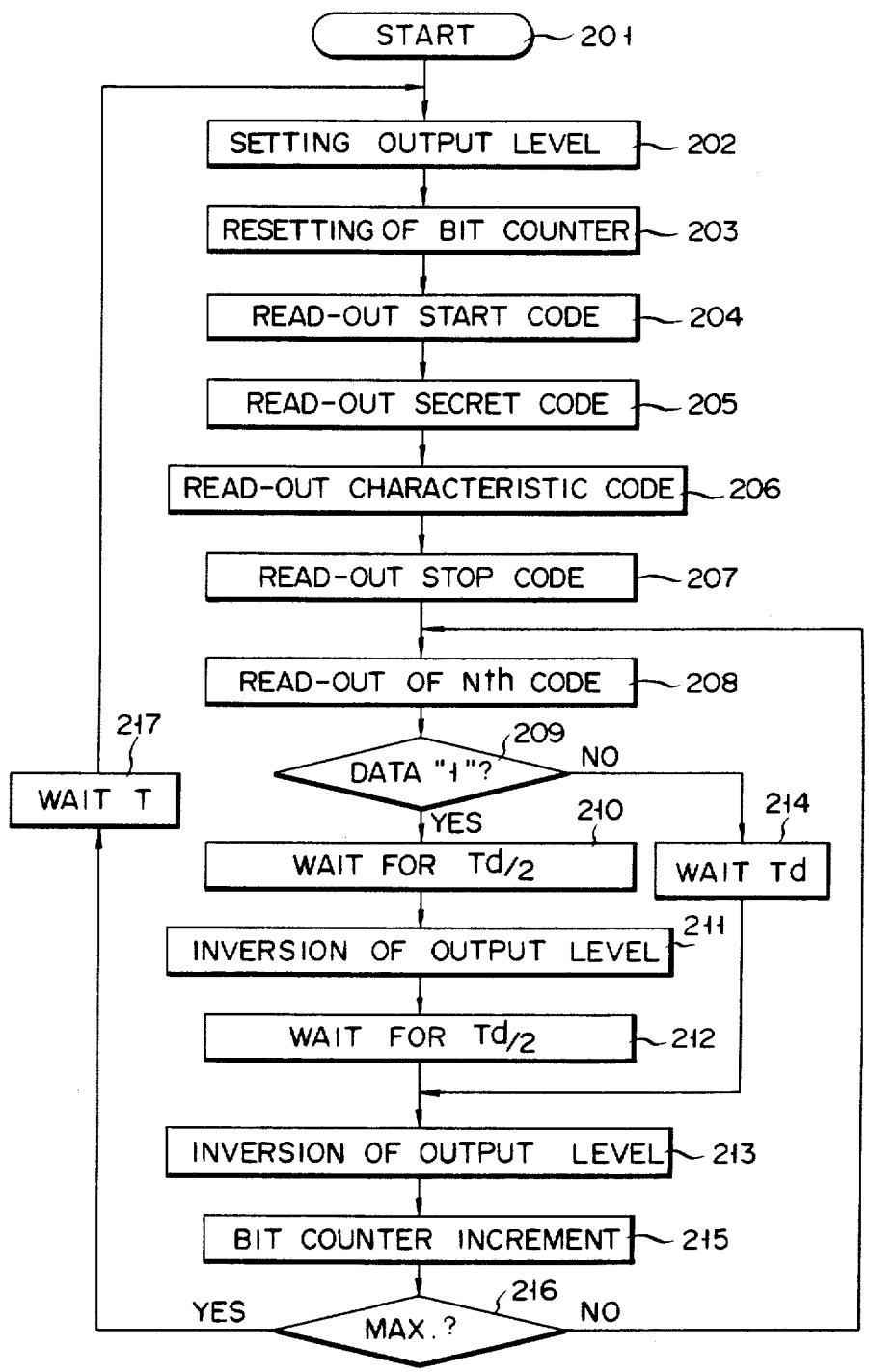
FIG. 9 is a flow chart showing the data-issuing operation of the microcomputer.

FIG. 9 is a flow chart showing the sequential steps of an operation effected in accordance with a control program stored in the ROM element received in a microcomputer prepared from a semiconductor chip 142 used with the data memory device of this invention. The ROM of the microcomputer is previously supplied with an arrangement of low level language instructions conforming with a control program.

When an output voltage from the power source device 13 rises to a prescribed level, the computer commences operation at the power-on start Step 201. At Step 202, an output signal supplied to the drive circuit 18 is set at an initial state, namely, a logic level of "1". This operation means that the first bit (the leading bit of a start code) is set at a prescribed logic level "1".

At Step 203, the contents of a bit counter (which is provided by designating the address of a register received in the CPU or RAM) are reset. The contents of this bit counter corresponds to the bit number of data which is transmitted currently. At steps 204, 205, 206, 207 a start code, secret code, a characteristic code and stop code are respectively read out to be temporarily stored in the RAM housed in the computer. The length of time required to read out data and store it temporarily in the RAM is much shorter than the phrase of 1 data bit.

At Step 208, the data bit of the Nth order denoted by the current contents of the bit counter is read out of the RAM to be stored in a register housed in another CPU.

At Step 209, determination is made as to whether the data bit of the Nth order thus read out has a logic level "1". If it is judged that this is the case, then waiting is carried out at Step 210 to an extent Td/2 corresponding to half of one phrase. At Step 211, the level of an output signal is inverted. Waiting of Td/2 is again carried out at Step 212. At Step 213, the level of an output signal is again inverted.

When the data of the Nth order has a logic level "0", then waiting is carried out to an extent of Td corresponding to one phrase at Step 214. At Step 213 the level of an output signal is inverted. Thus the F2F type coded frequency signal shown in FIG. 8A is issued.

At Step 215 the contents of the bit counter are incremented. At Step 216 judgement is made as to whether the incremented contents have reached a prescribed maximum value. While said maximum level is not reached, Steps 208 to 216 are taken once more. A series of data which are specified by the bit counter, successively incremented and indicate a bit number of 0, 1, 2, 3, ... max are subjected to the F2F modulation and supplied to the drive circuit 18 as a signal having a logic level "1" or "0".

Figure 10:
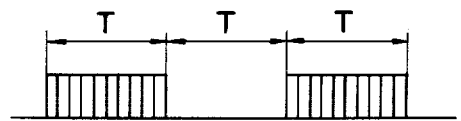
FIG. 10 is a time chart illustrating the manner in which recorded data is read out.

After a series of data has thus been transmitted, waiting is carried out for a prescribed length of time T at step 217. Later, operation returns to Step 202 to repeat the transmission of the same data. The abovementioned waiting time T is defined to be substantially equal to a length of time required to send forth all data only once. As a result, the same data is issued during a prescribed number of repeated periods 2T shown in FIG. 10.

The performance of "waiting" in the computer is effected by actuating, for example, an internal counter, comparing counted data with a prescribed value and preserving a certain state until the counted data reaches the prescribed value.

Figure 11:
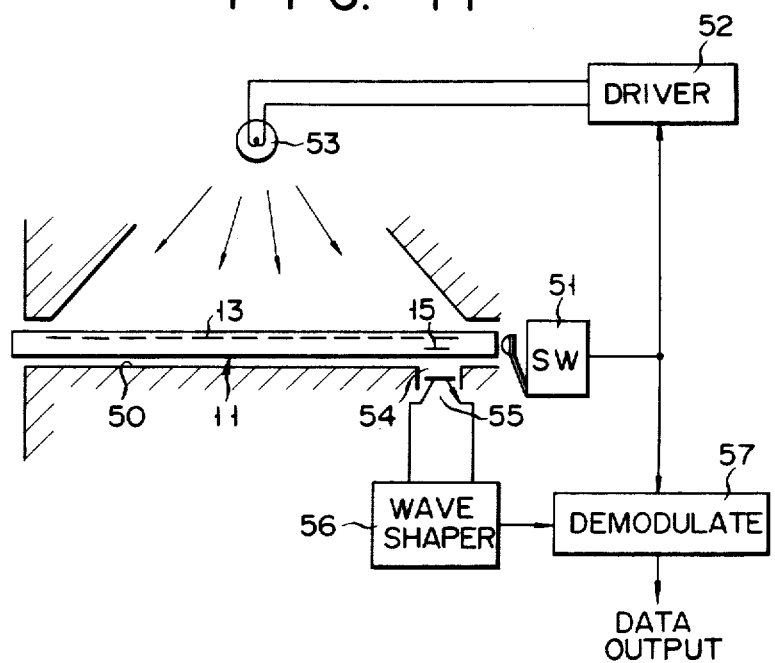
FIG. 11 is a schematic chart showing the means by which data is read out of the data memory device.

A device for detecting and processing data read out of the above-mentioned data memory device 11 should advisably be constructed as illustrated in FIG. 11. The data reading device 11 contains a passage 50 allowing for the insertion of the data memory device 11 fabricated, for example, in the card form and a microswitch 51 which is actuated when said data memory device 11 is fully inserted into the passage 50. When actuated, the microswitch 51 gives an instruction to the drive circuit 52, causing the lamp 53 to be lighted, thereby supplying optical energy to the power supply device 13 (solar cells) of the data memory device 11 held in the passage 50. As a result, the light-emitting element 15 of the data memory device 11 is optically controlled in conformity with the stored data, and issues data in the form of a light.

The passage 50 has a hole 54 positioned to face the window of the light-emitting element 15, and a light-receiving element 55 set to face said hole 54. An output optical signal from the light-emitting element 15 which has been detected by the light-receiving element 55 is converted into an electric signal corresponding to the read-out data. In other words, signals shown in FIG. 8C are detected by the light-receiving element 55. The detected signal has its waveform shaped by a wave shaper 56 (FIG. 11) into a rectangular pulse, which in turn is conducted to the demodulating circuit 57. This demodulating circuit 57 is supplied with known pulses and demodulates the F2F type modulated signals into a series of bits having logical levels "1" and "0" by measuring the time width of the respective pulses.

Figure 12:
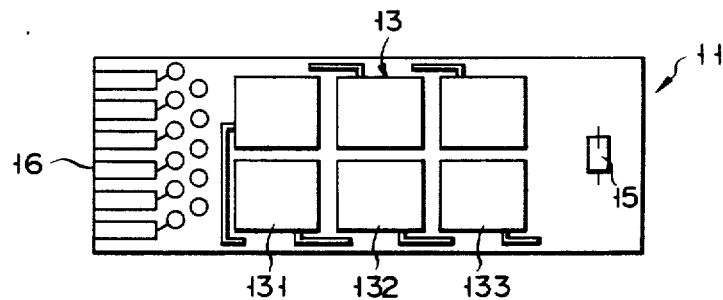
FIG. 12 is a plan view of a data memory device according to a second embodiment of this invention.

The foregoing embodiment refers to the case where the microcomputer and semiconductor memory were prepared from separate semiconductor chips 141, 142. It is obviously possible to apply the ROM received in the computer as a semiconductor memory. Further, a logic circuit device including proper peripheral circuits may be formed of a single chip. If free of optical obstructions, the power supply device 13 formed of the solar cells supplied with optical energies and the output light-emitting element 15 may be provided, for example, on the same plane as indicated in FIG. 12.

The means for issuing an optical output signal need not be limited to a self-light emitting element 15 such as a light-emitting diode, but may be formed of a transparent or reflecting liquid crystal display device.

Figure 13:
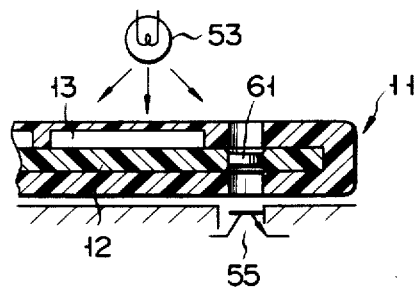
FIGS. 13 and 14 respectively show the optical signal-issuing sections of the data memory devices according to third and fourth embodiments of the invention.
Figure 14:
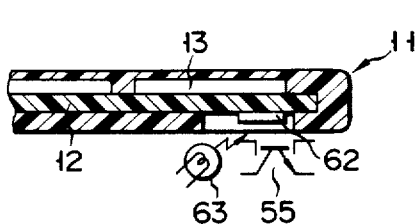
Figure 15:
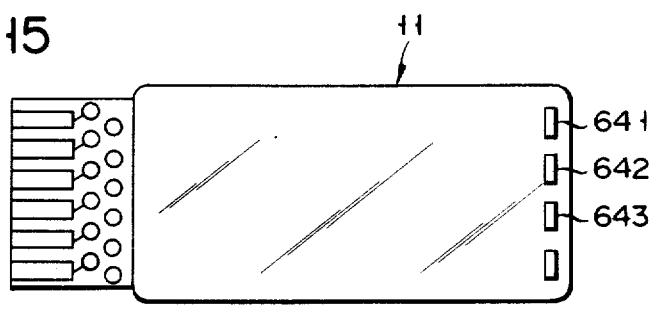
FIG. 15 is a plan view of a data memory device according to a fifth embodiment of the invention.
Figure 16:
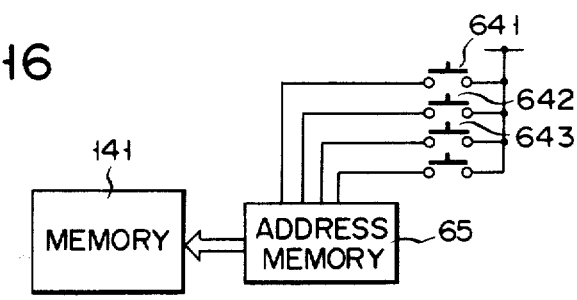
FIG. 16 shows a circuit which shows the means by which data is selectively read out of the memory device of FIG. 15.

FIG. 13 illustrates a transparent liquid crystal display device 61. When data is read out, the light of the lamp 53 supplying optical energy to the power supply device 13 formed of, for example, a plurality of solar cells, is transmitted to the light-receiving element 55 through the liquid crystal display device 61. When a reflection type liquid crystal display device 62 shown in FIG. 14 is applied, it is advised to illuminate the surface of the display device 62 by a lamp 63 and detect reflections from the illuminated surface by the reflection-receiving element 55. It is also possible, as shown in FIG. 15, to provide a plurality of selection switches 641, 642, ... along one crosswise edge portion of the rectangular data memory device 11 with the operation sections of said switches exposed and select the contents of a code signal issued by operating one of said selection switches from among the already stored items of data. FIG. 16 shows a circuit arrangement corresponding to said selection switches 641, 642, .... According to this circuit arrangement, an address-selecting instruction given by the operation of one of said selection switches 641, 642 ... is issued from an address memory 65 used to specify a read address to a semiconductor memory prepared from a semiconductor chip 141.

What is claimed is:

1. A data memory device for light-energized, serial reading-out of stored coded data from said data memory devices to an optical scanner, comprising:
   a circuit board in the form of a portable card;
   power supply means, attached to said circuit board, for generating electric energy when applied with photo energy;
   a semiconductor chip logic circuit attached to said circuit board and being operative when supplied with said electric energy from said power supply means, said logic circuit including: (1) semiconductor memory means for storing said coded data, (2) read out means for reading said coded data from said semiconductor memory means thereby generating coded signals corresponding thereto, (3) waiting time setting means for setting a waiting time when said read-out means finishes generating said coded signals, and (4) means for initiating operation of said read-out means upon lapse of the waiting time set by said waiting time setting means; and optical output means, coupled to said logic circuit, for generating and intermittently supplying optical output signals corresponding to said coded signals supplied from said logic circuit and adapted to be sensed by said optical scanner.

2. A data memory device as in claim 1, wherein said power supply means comprises a plurality of solar cells.

3. A data memory device as in claim 1, wherein said portable card is wholly sealed in a synthetic resin case.

4. A data memory device as in claim 1, wherein said power supply device is wholly sealed in a synthetic resin case and said optical output means is mounted on said one side of said circuit board.

5. A data memory device as in claim 3 wherein said synthetic resin case is everywhere opaque except for those portions which enclose said power supply means and said optical output means.

6. A data memory device as in claim 5, wherein opaque portions of said synthetic resin case have roughened surfaces.

7. A data memory device as in claim 5 wherein opaque portions of said synthetic resin case include applied light-impermeable coloring matter.

8. A data memory device as in claim 1, wherein said power supply means comprises a plurality of solar cells sealed in a transparent synthetic resin case.

9. A data memory device as in claim 1, wherein said optical output means includes a light-emitting element attached to said circuit board for intermittently emitting said optical output signals.

10. A data memory device as in claim 1, wherein said optical output means includes a transparent liquid crystal display device, positioned with its major surfaces flush with those of said circuit board, for intermittently supplying light from said circuit board in accordance with said coded signals supplied from said logic circuit.

11. A data memory device as in claim 1, wherein said optical output means includes a reflective liquid crystal display, one major surface of which being positioned to receive light from an external source, for intermittently reflecting light in accordance with said coded signals supplied from said logic circuit.

12. The memory device as in claim 1, wherein said power supply means is attached to one side of said circuit board, and said semiconductor chip logic circuit is attached to another side of said circuit board, whereby said optical output signal of said optical output means is emitted from said other side of said circuit board.

13. A portable data memory device comprising:
a synthetic resin case which is constructed wholly in a card form;
a circuit board mounted in said case;
a solar battery mounted on said circuit board which converts optical energy into electric energy;
memory means mounted on said circuit board which stores predetermined coded data;
electronic control means mounted on said circuit board which reads out said coded data from said memory means into serial electric signal when supplied with electric energy from said solar battery device, said electronic control means including:
  (1) read-out means for reading said code data from said memory means, thereby generating coded signals corresponding thereto,
  (2) waiting time setting means for setting a waiting time when said read-out means finishes generating said coded signals, and
  (3) means for starting the operation of said read-out means upon lapse of the waiting time set by said waiting time setting means; and
a light-emitting element which receives electric energy from said solar battery and issues an optical output signal corresponding to said serial electric signal from said control means.

14. The data memory device according to claim 13, wherein said power supply device is mounted on one side of said circuit board, and wherein said optical output device is provided on the other side of said circuit board.

15. An apparatus for reading optical output signals from a data memory device, comprising:
a passage in which a data memory device is adapted to be inserted;
illuminating means provided in said passage, for supplying optical energy to a plurality of solar cells on said data memory device when said data memory device is inserted in said slot;
data decoding means provided in said passage, for detecting and decoding optical output signals supplied from said data memory device.

16. The apparatus as in claim 15, further comprising switch means provided in said passage and actuated by the insertion of said data memory device into said passage, thereby driving said illumination means.

17. The apparatus as in claim 15, wherein said solar cell means is arranged on one side of said data memory device and said illuminating means is arranged on the other side of said data memory device.

18. A method for reading stored data from a portable electronic card device, comprising the steps of:
inserting said device in a slot in which said device is adapted to be placed;
sensing the insertion of said card in said slot,
illuminating a light source in said slot in response to said sensing step, thereby activating solar cells on said device;
said activation of said solar cells energizing a memory on said device;
reading out from said memory a stored code; and
transferring said code from said device to a receiver in said slot.

* * * * *